United States Patent [19]
Haber

[11] Patent Number: 5,347,979
[45] Date of Patent: Sep. 20, 1994

[54] CHAFING DISH FOR OUTDOOR USE

[75] Inventor: Robert H. Haber, Woodcliff Lake, N.J.

[73] Assignee: D. W. Haber & Son, Inc., Bronx, N.Y.

[21] Appl. No.: 142,977

[22] Filed: Oct. 29, 1993

[51] Int. Cl.⁵ ............................................. F24C 5/00
[52] U.S. Cl. ........................................ 126/43; 126/33; 126/44
[58] Field of Search .................. 126/43, 44, 45, 33, 126/25 C, 214 C, 220, 48, 46; 431/144, 146, 344

[56] References Cited

U.S. PATENT DOCUMENTS

| 725,335 | 4/1903 | Glaessner | 126/43 |
| 5,012,791 | 5/1991 | McCabe | 126/44 |

FOREIGN PATENT DOCUMENTS

| 117661 | 12/1925 | Switzerland | 126/43 |
| 5857 | of 1915 | United Kingdom | 126/43 |

Primary Examiner—James C. Yeung
Attorney, Agent, or Firm—Charles E. Temko

[57] ABSTRACT

A chafing dish of a type in which food to be warmed is supported above a container of combustible fuel, particularly suited for outdoor use in which the occurrence of a burst of wind or a directed breeze is prevented from extinguishing or directing flames away from the undersurface of the chafing dish.

1 Claim, 3 Drawing Sheets

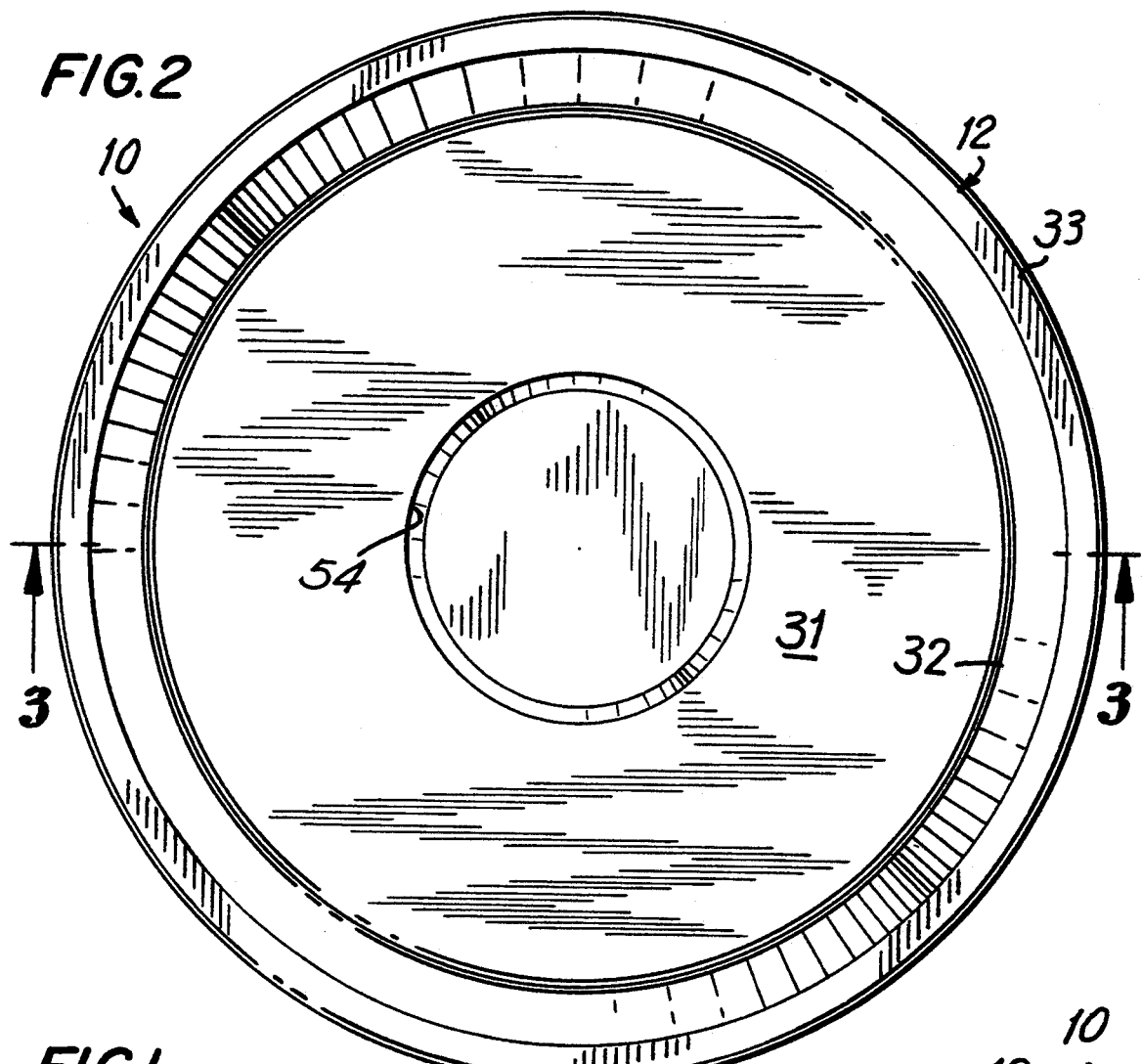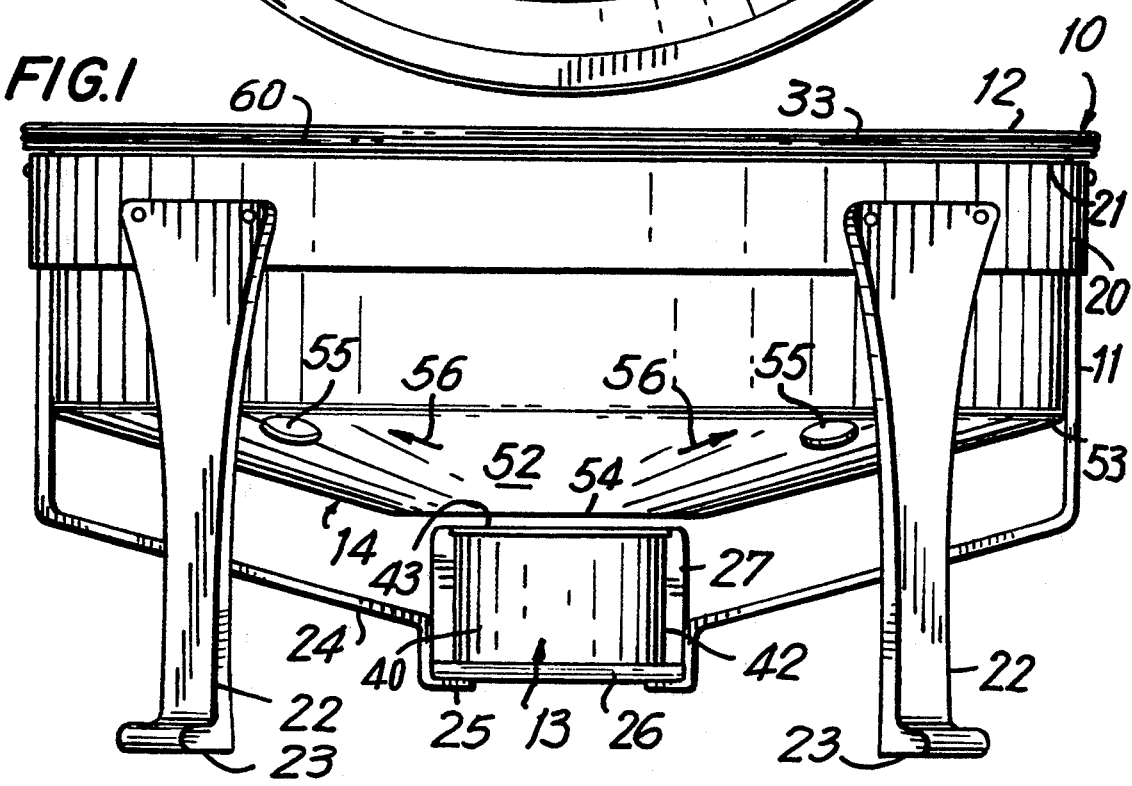

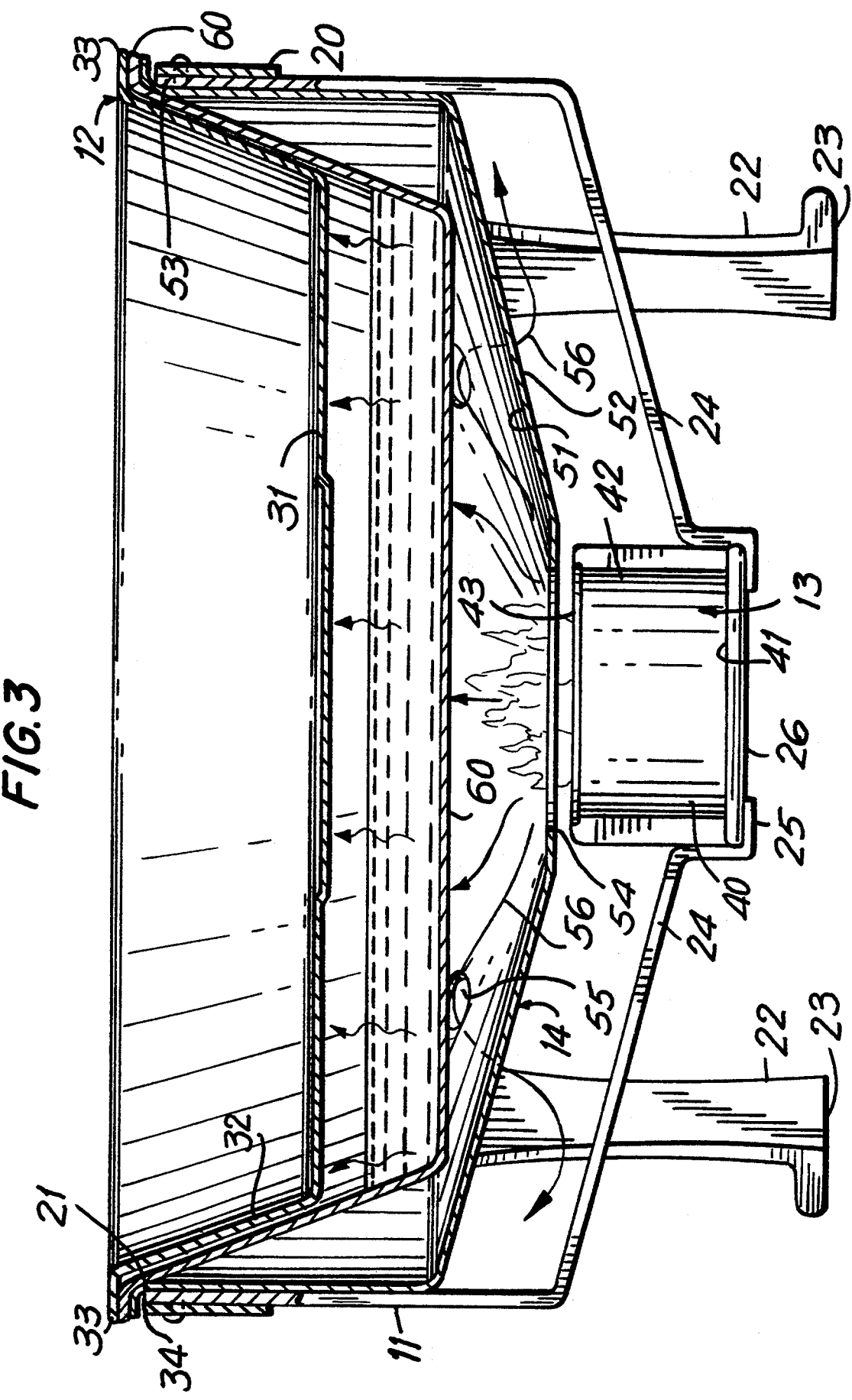

CHAFING DISH FOR OUTDOOR USE

BACKGROUND OF THE INVENTION

This invention relates generally to the field of culinary equipment, and more particularly to an improved chafing dish employed for maintaining food at a suitably warm temperature as the contents thereof are progressively dispensed. Devices of this general type are known in the art, and the invention lies in specific constructional details which particularly adapt the device for use outdoors by preventing ambient winds and breezes from affecting the transfer of heat from a flaming heat source to the food supporting pan.

SUMMARY OF THE INVENTION

Briefly stated, the invention contemplates the provision of an improved device of the class described in which the structure supporting the food tray incorporates not only a support means for a heat source, usually a small container of solidified alcohol, but a conically shaped shield which extends downwardly from the food pan to define a centrally positioned opening positioned a short distance above the mouth of the heat source container which allows the flowing of sufficient air to maintain combustion, but which regulates such flow to prevent it from exceeding that which is necessary irrespective of the presence of wind to which the device is often subjected.

BRIEF DESCRIPTION OF THE DRAWINGS

In the drawings, to which reference will be made in the specification, similar reference characters have been employed to designate corresponding parts throughout the several views.

FIG. 1 is a side elevational view of an embodiment of the invention.

FIG. 2 is a top plan view thereof.

FIG. 3 is a vertical central sectional view thereof.

DETAILED DESCRIPTION OF THE DISCLOSED EMBODIMENTS

Figure 4:
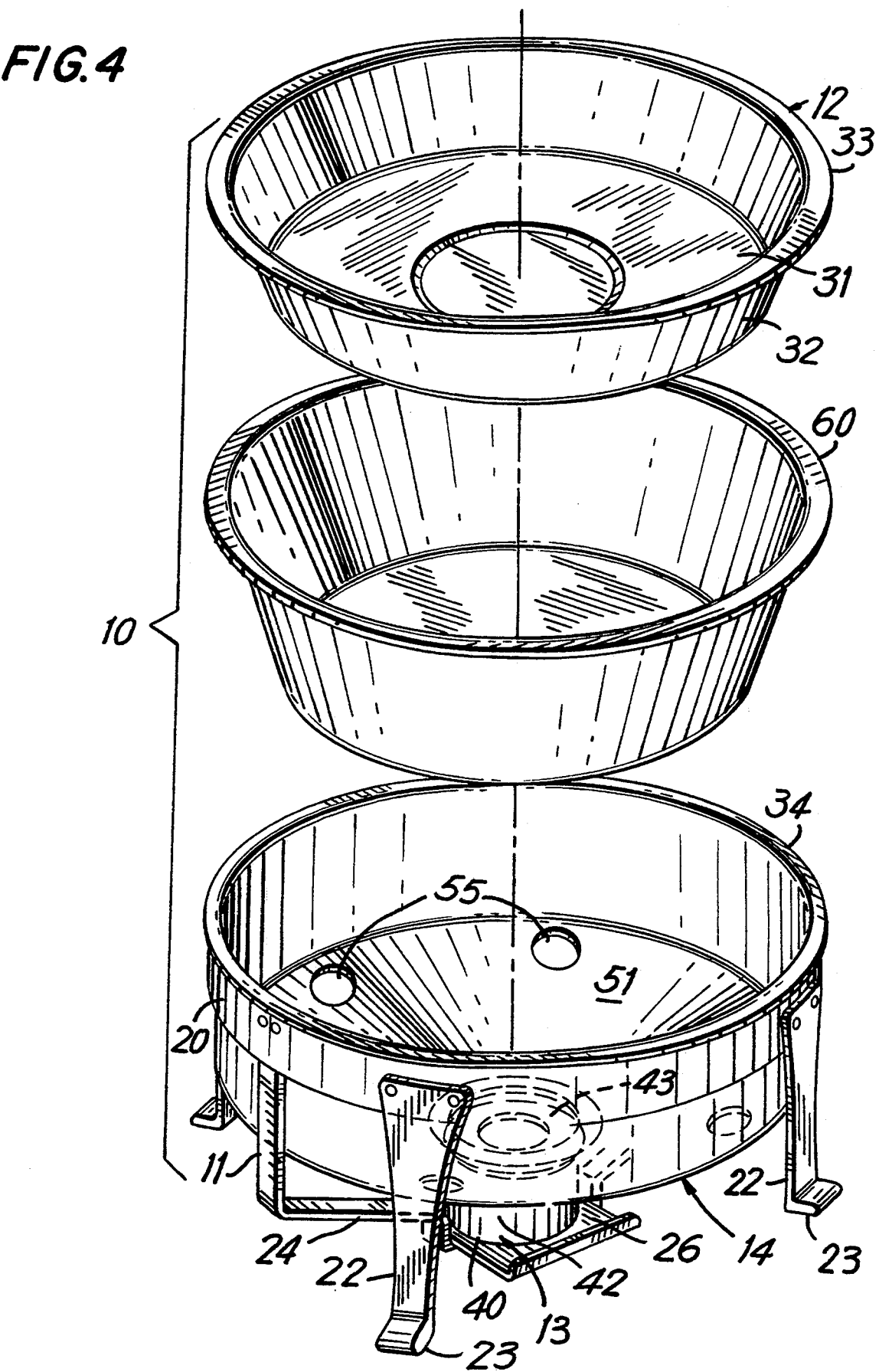
FIG. 4 is an exploded view in perspective.

In accordance with the invention, the device, generally indicated by reference character 10, comprises broadly, a main frame element 11, a food serving pan 12, a heat source element 13, and a flame shield element 14.

The main frame element 11 may be of known construction, including an annular peripheral rim 20 defining an opening 21 for the reception of the pan 12. Downwardly extending legs 22 position the rim a suitable distance above a supporting surface such as a table, the lower ends 23 thereof being disposed in a common plane. A radially inwardly extending support 24 includes an inner terminal 25 defining a platform 26 for the support of the element 13 and a vertically oriented masking cover 27, again as known in the art.

The pan 12 is conventional, and may be of fixed or detachable type. It is bounded by a planar bottom wall 31, an arcuate peripheral wall 32, and a horizontal rim 33 adapted to engage an upper edge 34 of the rim 20.

The heat source element 13 will normally be a readily available cylindrically shaped container containing solidified or jellied alcohol which burns through an upwardly facing opening without the use of a wick. The container 40 includes a lower wall 41 which rests upon the platform 26, a cylindrical side wall 42, and an upper wall 43 defining the above-mentioned opening (not shown).

The shield element 14 is preferably of downwardly facing frusto-conical configuration, and is bounded by an upper surface 51, a lower surface 52, an outer edge 53 which will normally be permanently interconnected to the rim 20, and a centrally disposed inner edge 54 defining a circular opening. Venting openings 55, preferably four or more in number, extend between the surfaces 51 and 52 and permit movement of warmed air emanating from the heat source in the direction of the arrows 56 during operation. The radially directed column of air disposed between the pan 12 and the shield element 14 will provide a continuous convection current tending to draw ambient air inwardly to the point of combustion continuously.

As best seen in FIG. 1, the opening formed by the edge 54 is preferably disposed a short distance varying from a quarter inch to three-quarter inch above the opening in the wall 43, the optimum distance being determined by the amount of air necessary to support combustion in a particular size container 40. Upon the occurrence of a breeze or gust of wind from any particular direction, the narrowness of the gap will prevent a substantial increase in the amount of air flow, and thus movement of the flame in a horizontal direction which would interfere with the warming of air disposed within the shield element.

The invention has application to that form of chafing dish in which the pan 12 is supported above an intermediate pan 60 containing water permitting the device to serve the function of a double boiler. In such case, the water carrying pan is disposed between the food serving pan and the shield element.

I wish it to be understood that I do not consider the invention to be limited to the precise details of structure shown and set forth in the specification, for obvious modifications will occur to those skilled in the art to which the invention pertains.

I claim:

1. In a chafing dish of a type including a main frame, a food serving pan supporting by said main frame, and a cylindrical combustible heat source element having a diameter also supported by said main frame disposed beneath said pan, the improvement comprising: a flame shield element carried by said main frame and positioned beneath said pan, said flame shield element being of frusto-conical configuration and tapering in a downward direction to define a centrally disposed planar opening of size corresponding to the diameter of said heat source element, said flame shield element having an outer peripheral edge and having through openings therein adjacent said peripheral edge to provide even distribution of heated air emanating from said heat source element; said opening in said flame shield element being positioned immediately above said heat source element a distance sufficient to provide air for combustion of fuel in said heat source element, while preventing excess air flow to said heat source element upon the occurrence of horizontally directed wind flow.

* * * * *